July 30, 1946.  A. B. KENNEDY  2,405,105
LEACHING APPARATUS AND METHOD
Filed Feb. 24, 1942   2 Sheets-Sheet 1
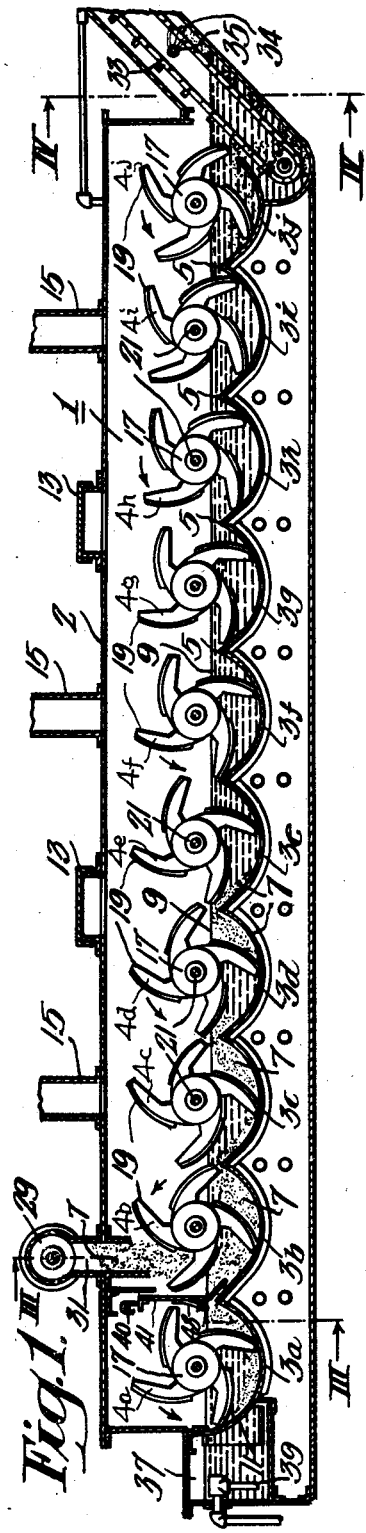
Inventor
Angus B. Kennedy
By Morris L. Rabkin
Attorney

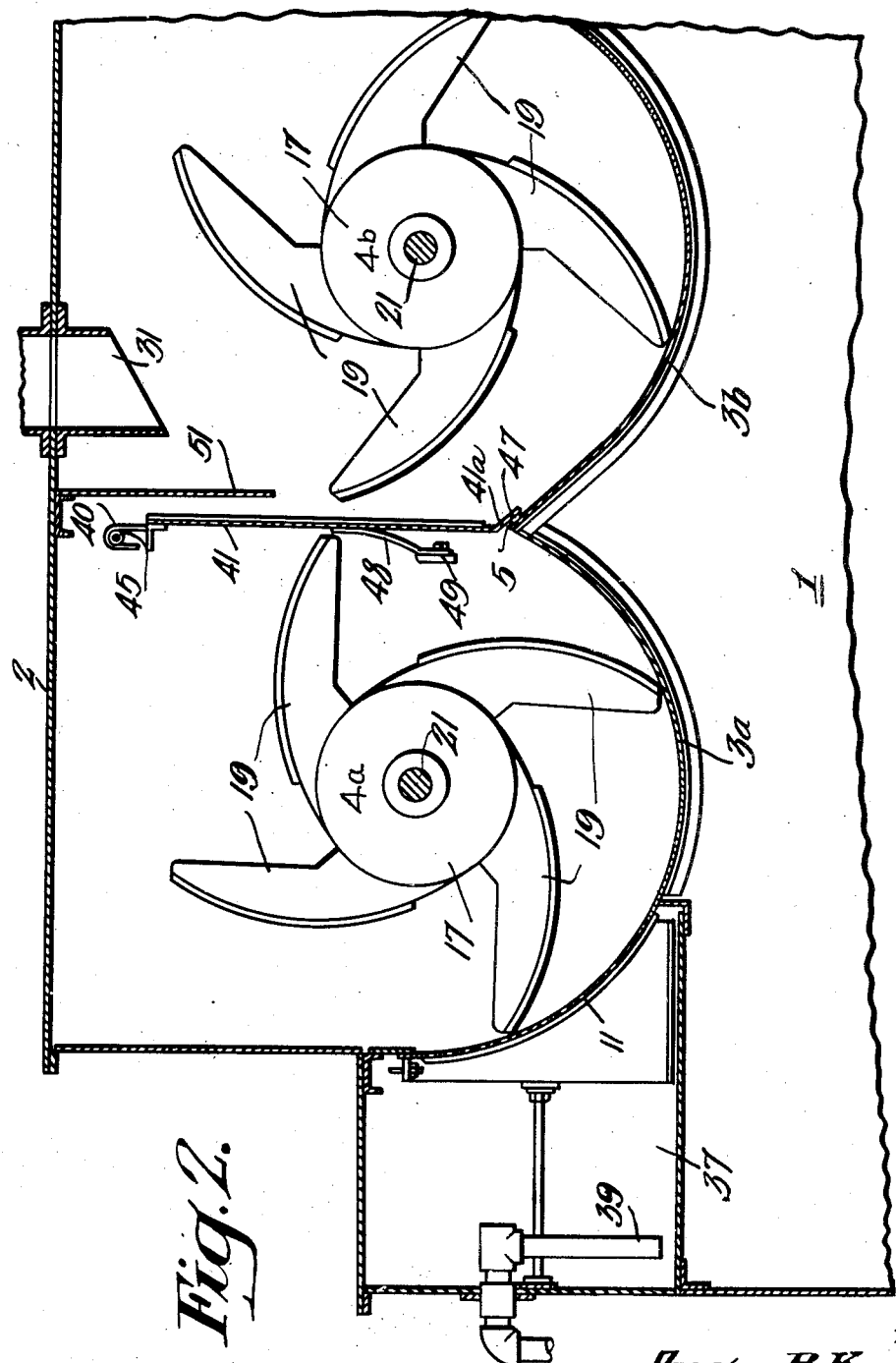

Patented July 30, 1946

2,405,105

UNITED STATES PATENT OFFICE 2,405,105

LEACHING APPARATUS AND METHOD

Angus B. Kennedy, Chambersburg, Pa.

Application February 24, 1942, Serial No. 432,115

9 Claims. (Cl. 23—310)

This invention relates to leaching apparatus, and more particularly to apparatus for extracting soluble constituents from solids by the use of suitable solvents, the present invention being an improvement over that disclosed in my United States Patent No. 1,628,787.

In this patent, there is disclosed a leaching apparatus suitable for the extraction of tannin, dyes, etc., from wood chips, bark root, and other similar substances. The apparatus comprises, in general, a tank having a series of adjacent leaching sections through which the material to be leached is successively passed in one direction while the solvent is caused to flow therethrough in the opposite direction, a paddle wheel in each section being arranged to feed the material through its own section and into the next succeeding section against the flow of liquid solvent. In this way, there is effected a continuous extraction of the soluble constituents from the solid particles.

More recently, the extraction of oils, fats and greases from seeds and the like by means of volatile solvents, such as hydrocarbon or chlorinated solvents, has come into fairly general use under the so-called solvent extraction process. Apparatus such as that disclosed in my above-identified patent is admirably suited to this process, although the particular form there disclosed has several disadvantages from the standpoint of efficiency when applied to the extraction of soluble constituents from small particles of solid matter by means of volatile solvents, and the primary object of my present invention, therefore, is to provide an improved leaching apparatus which will be free from the objections to which the specific form of apparatus shown in my aforementioned patent is open.

More particularly, it is an object of my present invention to provide an improved leaching apparatus by means of which it will be possible to extract with high efficiency the desired soluble constituents from small particles of solid matter.

Another object of my present invention is to provide an improved apparatus as aforesaid in which practically no solid particles, if any, will be able to escape the action of the solvent.

Still another object of my present invention is to provide an improved leaching apparatus of the type set forth wherein the trapping and subsequent advance through the solvent of any particles of solid matter which tend to escape at the charging section will be assured.

A further object of my present invention is to provide an improved leaching apparatus as set forth above wherein more uniform extraction of the soluble constituents as the solid material is advanced will be possible than was possible with the specific form of apparatus disclosed in my above-identified patent.

Still a further object of my present invention is to provide, in leaching apparatus of the type set forth, an arrangement of paddle wheels which will insure more uniform power requirements than was possible with the specific form of apparatus shown in my aforementioned patent.

It is also an object of my present invention to provide an improved leaching apparatus of the type described wherein a greater extraction capacity, as well as more uniform extraction, can be obtained.

A further object of my invention is to provide an improved leaching apparatus as aforesaid which is simple, yet sturdy, in construction, highly efficient in use, and relatively inexpensive to manufacture.

In accordance with my present invention, I provide a tank having a plurality of extraction sections, each provided with its own paddle wheel, as before, but also provide in advance of the first extraction section, which is the one into which the solid material to be leached is admitted, an additional section which I call the "filter section." This latter section is similar to the other sections but is provided with a strainer through which the solvent must pass in leaving the apparatus and with a filter wheel similar to the paddle wheels of the several extraction sections. I also provide a swinging baffle plate the pivotal mounting of which is over the filter section near the meeting edge of the filter section and the first extraction section, and the lower, marginal portion of which extends into the first extraction section below the level of the liquid solvent and carries one or more spacing blocks normally engaging the first extraction section at the aforementioned meeting edge whereby to leave an opening for the flow of solvent from the first extraction section to the filter section. The swinging baffle plate also carries a scraper which extends into the filter section and is arranged to cooperate with the filter wheel.

The solid material admitted into the first extraction section through one or more suitable charging spouts contains many particles which are quite fine. Now, in the apparatus disclosed in my above-identified patent, it was found that, as the material was fed into the extractor, an appreciable quantity of the finer, lighter particles separated from the mass and floated on top of the solvent in the first extraction section. These particles were carried by the solvent directly through the perforations of a strainer which originally formed part of the first extraction section. This separation and carrying away of the finer particles not only impaired the extractive efficiency, but also increased the difficulty of clarifying the miscella by settling and filtering in a subsequent operation.

It has been found that when the particles once become saturated with the solvent, they tend to agglomerate and remain with the mass; or if they become separated from the mass, they agglomerate and form a sludge which can then be separated from the solvent with comparative ease. Taking advantage of this phenomenon, I provide the aforementioned swinging baffle to insure that all particles are carried beneath the surface of the solvent and are immersed therein. This immersion wets the particles and they then tend to agglomerate and remain with the mass. Some of them, however, will be carried along by the flowing solvent beneath the baffle plate into the filter section where the proportion of liquid to solid is far greater than in the extraction sections, so that the flow of solvent in the filter section is relatively much slower. Hence, ample opportunity is afforded to the particles to become thoroughly saturated with the solvent and to settle out in the filter section in the form of sludge. As the filter wheel rotates, its blades scrape the sludge from the bottom of the filter section, including the fixed strainer therein, the blades also catching the lighter (or the less saturated) particles which do not settle out as readily. Eventually, each of the filter wheel blades, in succession, engages the scraper on the swinging baffle plate, thereby forcing the baffle plate to swing forwardly, or up away from the above-mentioned meeting edge, to thereby expose a relatively large opening into the first extraction section. At the same time, the scraper scrapes the sludge off from the filter wheel blades and causes it to be deposited in the first extraction section through this opening. In this way, none of the solid material is lost.

At the discharging end of the apparatus shown in my aforesaid patent, there is provided a conveyor which carries away the solid material from which the soluble constituents have been removed, the conveyor passing up at an angle from a terminal or conveyor section in which the liquid solvent is maintained at the operating level and into which this liquid is introduced by discharging onto the surface of the liquid. By this arrangement, the newly introduced solvent has no extractive effect at the time it is introduced. In accordance with my present invention, however, the solvent is introduced by being discharged through a perforated spray pipe extending across the full width of the apparatus and located at an elevation such that the spray therefrom comes in contact with the solid material after the latter has been raised above the level of the liquid in the extractor proper and partially drained. Since, with the improved arrangement, the partially drained particles of solid material are sprayed intimately with the fresh solvent, a very definite, additional extractive effect is obtained thereby and greater extractive efficiency results.

Another feature of the apparatus of my aforementioned patent which is, under certain circumstances, a disadvantage is the particular arrangement of the paddle wheels in the several extracting sections. In the former specific construction, these paddle wheels, all driven from a common drive shaft, are all arranged with their respective blades set on like centers. That is to say, each paddle wheel has the same number of blades spaced apart equi-angularly about the axis of rotation, and the corresponding blades all having the same angular relation to a reference plane (for example, a vertical plane extending across the apparatus through the axis of rotation of each wheel). With this arrangement, similar variations in load are encountered by each of the paddle wheels at the same time with the result that there occurs a good deal of surging in both the power factor and the extraction process. According to a further feature of my present invention, the paddle wheels are so arranged in their respective sections that the blades of each succeeding section are displaced angularly somewhat from the corresponding blades of each preceding section; that is, each paddle wheel is set at a different angle from its preceding paddle wheel. In this way, the power requirements are more evenly distributed, the extraction process is more uniform, and a greater capacity is obtained.

The novel features that I consider characteristic of my invention are set forth with particularity in the appended claims. The invention itself, however, both as to its organization and method of operation, as well as additional objects and advantages thereof, will best be understood from the following description of one embodiment thereof, when read in connection with the accompanying drawings, in which Figure 1 is a longitudinal sectional view of one form of improved apparatus according to my present invention, Figure 2 is an enlarged, detail section showing the first extraction section, the filter section and the baffle structure associated therewith, Figure 3 is a transverse sectional view taken on the line III—III of Figure 1, and Figure 4 is a similar view taken on the line IV—IV of Figure 1.

Referring more particularly to the drawings, wherein similar reference characters designate corresponding parts throughout, there is shown a tank 1 provided with a plurality of upwardly-concave tubs 3a, 3b, 3c, 3d, 3e, 3f, 3g, 3h, 3i, 3j which extend across the entire width of the tank in parallel relation to each other, the tubs being serially connected to form a continuous leaching chamber and adjacent tubs meeting along a common edge 5. These tubs constitute a plurality of successive operating stations or sections at which the particles of solid material 7, from which a soluble constituent is to be extracted by means of a fluid solvent 9, are subjected to the action of the fluid. The tub or section 3a is provided with a strainer 11 and constitutes primarily a filter section wherein the finer, lighter particles 7 are conditioned to remain in the fluid, while the sections 3b, 3c, 3d, 3e, 3f, 3g, 3h, 3i, 3j constitute more particularly extraction sections wherein the soluble constituent is dissolved out. The tank 1 is also provided with a top 2 which may be formed with several, preferably covered hand holes or inspection openings 13 and one or more ventilating pipes 15 through which vapors generated during the leaching process may escape.

Cooperating, respectively, with the tubs 3a, 3b, 3c, 3d, 3e, 3f, 3g, 3h, 3i, 3j are a plurality of individual paddle wheels 4a, 4b, 4c, 4d, 4e, 4f, 4g, 4h, 4i, 4j each extending across the full width of the tank 1 similarly to the tubs 3a, 3b, 3c, 3d, 3e, 3f, 3g, 3h, 3i, 3j and each having a hub 17 from which extend the same number of curved, perforated blades 19 all spaced apart equiangularly on their respective hubs. The hubs 17 are secured to rotary shafts 21 each of which has fixed thereto outside of the tank 1 a worm wheel 23 in mesh with a worm 25 on a main driving shaft 27 which receives power from a suitable source (not shown).

The paddle wheels 4a, 4b, 4c, 4d, 4e, 4f, 4g, 4h, 4i, 4j rotate relative to their respective tubs at each station and, in so doing, feed the solid material in each tub toward and into the next succeeding tub. The solid material 7 may be supplied to the tank by a suitable conveyor, such as a screw conveyor 29, and is introduced into the tank at the first extraction station or section 3b through one or more delivery spouts 31. Where the tank I is fairly wide, two spouts may be used, as shown in Figure 3, in order to obtain even distribution of the material 7 across the width of the tank. If desired, the spout which is fed first by the conveyor 29 may be provided with a sliding gate or valve 32 which may be adjusted to insure substantially equal flow of the solid material through each of the spouts 31. In any case, the solid material introduced into the station or section 3b is fed therethrough in segregated masses to the next station 3c by the blades of the associated paddle wheel 4b. At the station 3c, the blades of the paddle wheel 4c pick up these segregated masses of solid material and feed them through the tub 3c to the tub 3d where the paddle wheel 4d picks up these masses, in turn, and so on until, finally, the last paddle wheel 4j advances the leached material out of the tub 3j and onto a suitable conveyor, such as a drag conveyor 33, which passes out of the tank in an upwardly inclined direction to discharge the leached residue.

If the paddle wheels were all set on the same center on their respective shafts 21, it is obvious that corresponding blades of each paddle wheel would encounter the loads provided by each segregated mass of material 7 in each tub at the same time, as in the apparatus of my above-identified patent. This would result in periodic and considerable surges in power requirements and would impair the extractive efficiency. To avoid this, each paddle wheel is so mounted on its shaft 21 that its blades are spaced a suitable angle, for example 10°, from the corresponding blades of the next adjacent paddle wheel, the settings being progressive. Thus, for example, with the paddle wheel 4b in place, the wheel 4c is so set that its blades are displaced 10° counter-clockwise on its shaft relative to the blades of the wheel 4b; the paddle wheel 4d is so set that its blades are displaced 20° counter-clockwise on its shaft relative to the blades of the wheel 4b but only 10° relative to the blades of the wheel 4c; the paddle wheel 4e is so set that its blades are displaced 30° counter-clockwise on its shaft relative to the blades of the wheel 4b, only 20° relative to the blades of the wheel 4c, and only 10° relative to the blades of the wheel 4d, and so on. In this way, substantially uniform power requirements are maintained and more uniform extraction is obtained.

The fluid solvent 9 is introduced into the tank I through a perforated spray pipe 35 which extends across the width of the tank between the upper and lower strands of the conveyor 33 and is arranged to direct its spray downwardly onto the solid residue which is being carried upwardly by the flights 34 secured to the then lower strand of the conveyor, as clearly seen from Figure 1. The tank is preferably given a slight fall from the tub 3j to the tub 3a wherefore the solvent 9 will flow, by gravity, toward the tub 3a and in a direction opposite to that in which the solid material 7 is advanced from the tub 3b to the conveyor 33, the solvent becoming more and more concentrated as it passes through each station in succession. After passing through the strainer 11 in section 3a the liquid solvent flows into a tank 37 from which it is withdrawn through a pipe 39 which extends down nearly to the bottom of the tank 37 to insure drawing off any sediment or sludge which may tend to collect in the compartment 37. The pipe 39 also insures a proper level being maintained for the liquid 9 in the tank, this level being dependent upon such factors as the nature of the material handled, the extractive effect desired, the rate of flow of solvent, etc., but in any case being preferably slightly above the meeting edges 5 between adjacent tubs. The spray pipe 35 is located above the level of the solvent 9, as can be clearly seen from Figure 1. With this arrangement, the fresh solvent discharged through the pipe 35 comes in contact with the solid residue on the conveyor 33 after the residue has been raised above the level of the liquid and partially drained. By thus intimately spraying the residue with fresh solvent, a very definite additional extractive effect is obtained and a higher extractive efficiency is realized.

The solid material introduced into the extractor through the spouts 31 may include many fine particles which, in the dry or substantially dry state, float on the surface of the liquid solvent 9. With the particular construction shown in my prior patent, these fine particles were carried away by the flowing liquid without being properly extracted. To intercept these fine particles, there is now provided the additional "filter section" 3a between which and the first extraction section 3b is pivotally mounted, as by means of several hinge straps 40, a baffle plate 41 which extends across the entire width of the tank I and is preferably provided with rubber or other suitable wipers 43 along its side edges, as clearly shown in Figure 3. The baffle plate 41 is pivotally carried on a rod or shaft 45 which is located above and slightly to the left of the meeting edge 5 between the tubs 3a and 3b, as viewed in Figs. 1 and 2, or above the tub 3a, the lower end of the baffle plate being bent at an angle to provide a flange 41a which extends into the tub 3b below the level of the liquid 9. By locating the pivot shaft 45 as above described, the baffle plate 41 tends constantly to swing down in a clock-wise direction, as shown, to bring its flange 41a down against the adjacent meeting edge 5. A plurality of spacing blocks 47 which are secured at spaced intervals to the lower face of the flange 41a serve to keep the flange 41a spaced sufficiently from the edge 5 to permit the liquid 9 to flow from the tub 3b to the tub 3a.

Secured to the baffle plate 41, as by means of several spaced straps 48, and extending into the filter section or station 3a in the path of movement of the blades of its paddle wheel 4a is a scraper 49 which also extends substantially across the width of the tank. The scraper 49 is arranged to cooperate with each blade 19 of the paddle wheel 4a, the engagement of each blade therewith serving to swing the baffle plate counter-clockwise and away from the adjacent meeting edge 5 to expose a relatively large opening therebetween through which may be passed solid material scraped off from each of the blades in turn.

When the extractor is set up for operation, the tubs 3a, 3b, 3c, 3d, 3e, 3f, 3g, 3h, 3i, 3j are filled to the desired level with a suitable solvent and the particles of solid material are introduced through the spouts 31 into the first extraction section 3b.

The rotating blades 19 of the paddle wheel 4b divide the falling material into segregated masses and carry these masses down into the solvent 9 then at the station 3b where the material is thoroughly wetted and some of the soluble constituent extracted therefrom. The material is then advanced to the second extraction station 3c where further extraction takes place, and thence successively through each of the extraction stations 3d, 3e, 3f, 3g, 3h, 3i, 3j against the flow of fluid which has a smaller concentration of soluble constituent at each station as the final extraction station 3j is approached. The solvent meanwhile flows from the conveyor 33 toward the tank 37 from which it is withdrawn as heretofore described.

Of the solid material fed through the spouts 31, many particles are so fine and light that they float on the surface of the liquid 9 and even tend to float in the air above the tub 3b, particularly if they bounce back off from the blades 19. The wipers 43 and a fixed plate 51 secured to the top 2 of the tank between the spouts 31 and the swinging baffle plate 41 keep the fine dust from passing directly into the filter section 3a and from clogging the hinges of the baffle plate 41. These fine particles eventually reach the surface of the liquid 9 in the tub 3b and are carried thereby under the flange 41a. The particles are thus immersed in the liquid and become thoroughly wetted, and they then tend to agglomerate and remain with the mass of solid material. However, some of these particles are carried by the flowing liquid into the section 3a where the proportion of liquid to solid is far greater than in the extraction sections 3b, 3c, 3d, 3e, 3f, 3g, 3h, 3i, 3j. Consequently, ample opportunity is afforded for these particles to become thoroughly saturated with the solvent and to settle out in the form of sludge. If any of these particles do not settle out, they are intercepted by the blades of the rotating paddle wheel 4a or, if they pass through the perforations of the blades, they are intercepted by the strainer 11.

As the paddle wheel 4a turns, the outer edges of its blades scrape the particles from the surface of the strainer 11 and also push forward the other particles which have settled in the bottom of the filter section 3a, the agglomerated particles clinging to the blades 19. Eventually, the middle portion of each curved blade 19 first comes in contact with the scraper 49 and continued rotation of the paddle wheel causes the baffle plate 41 to be swung away from the adjacent meeting edge 5 to expose a large opening into the tub 3b. At the same time, since the blades 19 are dragged against the scraper 49, the scraper removes the sludge from the blades and causes it to be deposited in the tub 3b through the temporarily exposed opening. Thus, the fine particles join the mass of material and none of the material is lost.

To permit the baffle plate to swing properly between the blades of the two paddle wheels in the sections or stations 3a and 3b without having the blades become fouled, these two wheels are suitably displaced. A difference of approximately 50° in the setting of the blades on their respective shafts 21 has been found quite satisfactory.

From the foregoing description, it will be apparent that I have provided an improved leaching apparatus by means of which soluble constituents may be extracted with great efficiency from solid particles of event the most minute size. One application of the improved apparatus herein described wherein it has proven particularly advantageous is in the solvent extraction of cocoa butter from cocoa bean residue. Other applications will, no doubt, readily suggest themselves to those skilled in the art. Also, various changes in and modifications of the particular form of the invention disclosed herein, as well as other embodiments thereof, all falling within the spirit of the present invention, will undoubtedly suggest themselves. I therefore desire that my invention shall not be limited except insofar as is made necessary by the prior art and by the spirit of the appended claims.

I claim as my invention:

1. In countercurrent leaching apparatus in which solids to be leached are introduced adjacent one end of the apparatus and solvent liquid adjacent the other, a pair of adjacent leaching units having a common top edge constructed to permit the flow of solvent successively through said units, means for introducing into one of said units constituting a receiving unit the solids to be leached, and a barrier supported above and in proximity to said common top edge for yielding movement toward said receiving unit, said barrier being located to normally prevent passage of aggregated solids from said receiving unit over said common top edge and into the other of said units, and said barrier being yieldable toward said receiving unit to permit reverse passage over said common top edge back to said receiving unit of any solids that may reach said other unit.

2. In countercurrent leaching apparatus in which solids to be leached are introduced adjacent one end of the apparatus and solvent liquid adjacent the other, a pair of adjacent leaching units having a common top edge constructed to permit the flow of solvent successively through said units in one direction, rotating means in each unit arranged to submerge the solids therein and to advance said solids therefrom in the reverse direction, means for introducing into the first of said units considered in said one direction and constituting a receiving unit the solids to be leached, and a barrier supported above and in proximity to said top edge for yielding movement toward said receiving unit, said barrier being located to normally prevent passage of aggregated solids over said common top edge from said receiving unit to the other of said units, and said barrier being yieldable toward said receiving unit to permit passage in said reverse direction from said other unit back to said receiving unit of any solids that may reach said other unit and that are advanced over said common top edge by the rotating means in said other unit.

3. In countercurrent leaching apparatus in which solids to be leached are introduced adjacent one end of the apparatus and solvent liquid adjacent the other, a series of successive leaching units adjacent ones of which have a common top edge constructed to permit the flow of solvent in one direction through and over the series, rotating means in each unit arranged to submerge the solids therein and to advance said solids successively from unit to unit over said common top edges in the reverse direction, means for introducing into one of said units adjacent the solvent discharge end of the apparatus and constituting a receiving unit the solids to be leached, there being an additional unit following said receiving unit in the direction of flow of said solvent and prior to the discharge of said solvent, and a barrier supported above and in proximity to the common top edge between said receiving unit and said additional unit for yielding movement toward said receiving unit, said barrier being located to normally prevent passage of aggregated solids over said last mentioned top edge from said receiving unit to said additional unit, and said barrier being yieldable toward said receiving unit to permit passage in said reverse direction from said additional unit back to said receiving unit of any solids that may reach said additional unit and that are advanced over said last mentioned top edge by the rotating means in said additional unit.

4. Leaching apparatus according to claim 3 wherein said barrier comprises a baffle plate mounted above said additional unit and extending down into said receiving unit below said common top edge therebetween, and wherein means are provided for normally maintaining said baffle plate in slightly spaced relation to said last mentioned common top edge.

5. Leaching apparatus according to claim 3 characterized in that said liquid is maintained at substantially a predetermined level at said leaching units, characterized further by the addition of a drag conveyor for removing to a point above said level the solid residue advanced from the last of said units considered in said reverse direction, and characterized still further by the addition of means for spraying fresh liquid onto said removed residue at said point.

6. In leaching apparatus for extracting a soluble constituent from solid material by means of a fluid solvent, the combination of a pair of adjacent tubs adapted to contain both said fluid and said solid material, a rotatable paddle wheel associated with one of said tubs and having a plurality of blades adapted, during rotation of said paddle wheel, to advance the solid material in its associated tub toward the other of said tubs, and means associated with said paddle wheel for removing from said blades all of said material advanced thereby and for effecting deposit of said advanced material in said other tub, said removing means comprising a pivotally mounted member normally occupying a position in the path of movement of and adapted to be successively engaged by each of said blades during rotation of said paddle wheel, the engagement of said member by said blades causing said member to swing on its pivotal axis while maintaining engagement with each blade in succession to thereby remove the solid material from each blade during swinging movement thereof.

7. In leaching apparatus for extracting a soluble constituent from solid material by means of a fluid solvent, the combination of a pair of adjacent tubs having a common meeting edge and adapted to contain both said fluid and said solid material, a rotatable paddle wheel associated with one of said tubs and having a plurality of blades adapted, during rotation of said paddle wheel, to advance the solid material in its associated tub toward the other of said tubs, a baffle plate pivotally mounted above said meeting edge and arranged to swing toward said edge, means normally maintaining said baffle plate spaced slightly from said edge whereby said fluid may pass from said other tub to said first named tub, and a scraper carried by said baffle plate and extending into the path of movement of said blades, said blades being adapted to successively engage said scraper to swing said baffle plate away from said edge and thereby expose a larger opening between said edge and said baffle plate, and said scraper being adapted, while engaging each of said blades in turn, to scrape off from each blade the material advanced thereby and to effect deposit of said advanced material in said other tub through said enlarged opening.

8. In the method of extracting from a material a soluble constituent therein by means of a flowing liquid solvent for said constituent arranged to flow successively through a plurality of extracting units, said material including particles of such fine form that said particles tend to flow on the surface of said liquid when deposited thereon in the dry state and to be carried along by said flowing liquid, the steps which comprise introducing said material including said fine particles to said liquid at one of said units constituting a receiving unit, causing the relatively heavier particles of said introduced material to be immersed and agglomerated in the liquid at said receiving unit, screening said agglomerated heavier particles against passage from said receiving unit into the next succeeding unit following said receiving unit in the direction of flow of said liquid while permitting said flowing liquid to advance said fine particles to said next succeeding unit, causng said advanced fine particles to become immersed in said liquid at said next succeeding unit whereby to effect thorough wetting and agglomeration of said advanced fine particles, and thereafter effecting return of said agglomerated fine particles from said next succeeding unit back to said receiving unit for immersion thereof in the liquid solvent then at said receiving unit.

9. In the method of extracting from a material soluble constituent therein by means of a flowing liquid solvent for said constituent arranged to flow in one direction successively through a plurality of extracting units, said material including particles of such fine form that said particles tend to flow on the surface of said liquid when deposited thereon in the dry state and to be carried along by said flowing liquid, the steps which comprise introducing said material including asid fine particles to said liquid at an intermediate one of said units constituting a receiving unit, causing the relatively heavier particles of said introduced material to be immersed and agglomerated in the liquid at said receiving unit, screening said agglomerated heavier particles against passage from said receiving unit into the next succeeding unit following said receiving unit in the direction of flow of said liquid while permitting said flowing liquid to advance said fine particles to said next succeeding unit, causing said advanced fine particles to become immersed in said liquid at said next succeeding unit whereby to effect thorough wetting and agglomeration of said advanced fine particles, thereafter effecting return of said agglomerated fine particles from said next succeeding unit back to said receiving unit for immersion thereof in the liquid solvent then at said receiving unit, and finally advancing said returned, agglomerated fine particles successively through each of the remaining units in counter-current relation to the flow of said liquid and immersing said agglomerated fine particles at each succeeding one of said remaining units in the liquid instantaneously in each of said last mentioned succeeding units.

ANGUS B. KENNEDY.